Jan. 23, 1934.  A. G. ROSE  1,944,577
MACHINE OR APPARATUS FOR CUTTING PLASTIC TOFFEE OR LIKE MATERIAL
Filed July 23, 1931  2 Sheets-Sheet 2
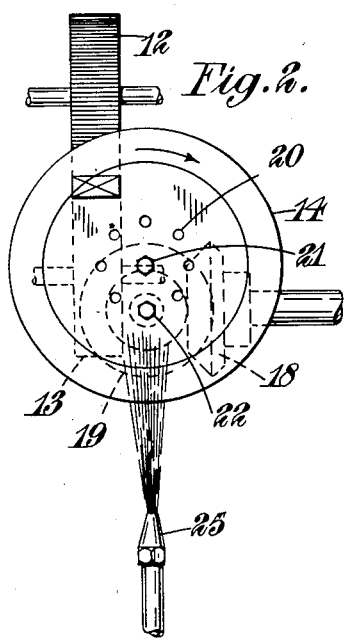
Inventor
Alfred German Rose,
By Byrnes, Stebbins, Parmelee & Blenko,
Attys.

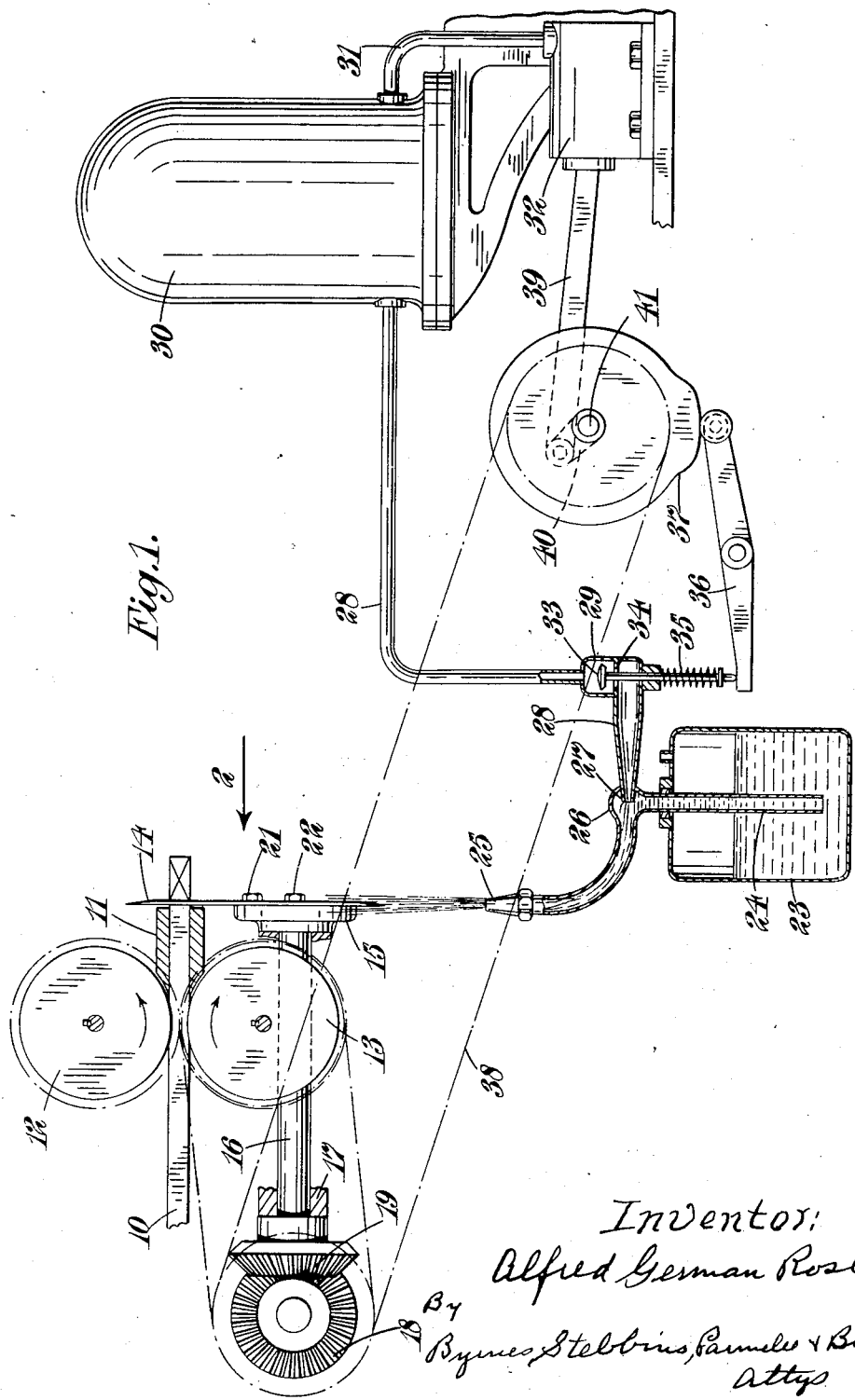

Patented Jan. 23, 1934

1,944,577

UNITED STATES PATENT OFFICE 1,944,577

MACHINE OR APPARATUS FOR CUTTING PLASTIC TOFFEE OR LIKE MATERIAL

Alfred German Rose, Lincoln, England, assignor to Rose Brothers (Gainsborough) Limited, Gainsborough, England, a British Company Application July 23, 1931, Serial No. 552,788, and in Great Britain July 30, 1930

2 Claims. (Cl. 107—22)

This invention is for improvements in or relating to machines or apparatus for cutting plastic toffee or like material.

In machines for cutting plastic material (such as toffee) the trouble arises that particles of the material adhere to and accumulate on the cutting knife and clog it. For this reason it has hitherto been necessary to suspend the operation of the machine periodically in order that an attendant may clean the knife. The present invention has for its chief object to obviate this disability and to this end provides in apparatus for severing plastic material the combination with a knife, of means for directing a spray or jet of a treating material on to the knife edge in order to prevent particles of the material clinging to it. I am aware that it is known in machine tools to direct a supply of lubricant on to the cutting tool, for example on to a milling cutter, and it is also known for example in cutting stone or glass to direct a spray containing an abrasive on to a blunt cutting tool. No claim is made to such constructions, the present invention being solely concerned with apparatus for severing plastic material such as toffee by means of a knife and with overcoming the disability pointed out above.

This invention also includes in apparatus for severing plastic material the combination with a knife, of a vaporizer arranged to direct a spray or jet on to the edge of the knife. The apparatus may comprise a container for a treating material, a nozzle adjacent to the knife edge, a conduit communicating between the nozzle and the interior of the container near the base of the latter, and a pressure fluid injector in or opening into the conduit for forcing the treating material through the nozzle.

The treating material may consist of a powder such as talcum powder, stearite, chalk or ground rice or of a liquid such as water, glycerine or oil.

One construction according to the present invention will now be described in detail by way of example with reference to the accompanying diagrammatic drawings, in which, Figure 1 is a side elevation partly in section, Figure 2 is an end elevation of a portion of the apparatus shown in Figure 1, looking in the direction of the arrow 2.

Throughout this description like reference numerals indicate like parts.

A bar of plastic material 10 is fed along a feed tube 11 between two feed rollers 12 and 13 towards a knife 14. The knife 14 is in the form of a disc with a cutting edge formed completely around its periphery. This disc knife is mounted on a knife-carrier 15 at the end of a shaft 16 which shaft is supported in a bearing 17 and driven through bevel gearing 18, 19. The disc knife 14 is formed with a hole at its geometrical centre and also with eight holes, numbered 20, equally spaced on a pitch-circle struck from this centre. The disc knife is bolted to the carrier 15 by a set-screw 21 which extends through a central hole in the disc into the carrier, and it will be observed that this set-screw is offset from the centre of the carrier by an amount equal to the radius of the pitch-circle of the holes 20. At the centre of the carrier is a second set-screw 22 which extends through one of the holes 20 into the carrier. Thus by slacking off the set-screw 21 and removing the set-screw 22 the disc may be turned around on the carrier to change the portion of its cutting edge which passes through the bar of stock 10. As one portion of the cutting edge becomes dulled the knife is adjusted to bring the next portion into operation until the complete cutting edge has been used. The knife severs a piece from the stock once in each revolution and its action is intermittent in the sense that cutting is effected only during a brief period in each revolution.

Beneath the above apparatus is a vaporizer somewhat similar to that commonly employed for spraying perfumes, disinfectants and powders. This vaporizer consists of a container 23 for a treating material of the kind previously mentioned, provided with a central vertical conduit 24 which terminates in a nozzle 25 adjacent to the knife edge. The end of this conduit 24 terminates inside the container 23 near the base of the latter and just above the container the conduit is bulged out as at 26. Inside the bulge 26 is a nozzle 27 of a pressure pipe 28 which leads from a valve chamber 29 and from a reservoir 30. The reservoir 30 communicates by a pipe 31 with an air compressor 32. The nozzle 27 is provided as shown with a somewhat restricted orifice and constitutes an injector. Inside the valve chamber 29 is a mushroom valve 33 which is drawn on to its seating 34 by a compression spring 35 but is periodically raised by means of a lever 36 which is rocked by a cam 37. The cam 37 is driven by means of a chain 38 (indicated by a chain dotted line) from a sprocket which rotates with the bevel gear 18. Thus a spray or jet of the treating material is directed on to the knife 14 once in each revolution of the latter so that the cutting edge is coated with the material before it passes through the bar of stock 10 and particles of the stock do not cling to it. The air compressor 32 is driven by a connecting rod 39 mounted at the end of a crank 40 which is attached to a shaft 41 on which the cam 37 is mounted.

I claim:—

1. In apparatus for cutting plastic material from a bar of stock, the combination with a rotatable knife carrier and a disc-shaped knife having a peripheral cutting edge eccentrically mounted on the carrier to cut intermittently, of a container for treating material, a nozzle located below the knife directed upwardly, a conduit extending between the nozzle and the container at the base of the latter, an air conduit, an air compressor, a second conduit extending from the air compressor to the air nozzle, a valve in the second conduit and means for operating the valve in synchronism with the intermittent cutting motion of the knife.

2. In apparatus for severing plastic material, the combination with a cutting mechanism including a rotatable knife carrier and a disc-shaped knife having a peripheral cutting edge and eccentrically mounted on the carrier, of an atomizer for applying a well distributed mist of lubricant over the knife, said atomizer having a nozzle directed towards the knife, a fluid reservoir, an air injector and a valve interposed between said fluid reservoir and air injector, said valve being operated in a predetermined relationship to the cutting mechanism.

ALFRED GERMAN ROSE.